US008752095B2

(12) United States Patent
Yang et al.

(10) Patent No.: US 8,752,095 B2
(45) Date of Patent: Jun. 10, 2014

(54) INTEGRATED DIGITAL DEVICE AND SELECTING METHOD THEREOF

(75) Inventors: Hong-Seok Yang, Seongnam-si (KR); Ji-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1371 days.

(21) Appl. No.: 11/489,488

(22) Filed: Jul. 20, 2006

(65) Prior Publication Data

US 2007/0070203 A1 Mar. 29, 2007

Related U.S. Application Data

(60) Provisional application No. 60/701,114, filed on Jul. 21, 2005.

(30) Foreign Application Priority Data

Aug. 30, 2005 (KR) .................. 10-2005-0080352

(51) Int. Cl.
*H04N 7/16* (2011.01)
*H04N 21/414* (2011.01)

(52) U.S. Cl.
CPC .............................. *H04N 21/41407* (2013.01)
USPC ........................................................ 725/62

(58) Field of Classification Search
CPC ................................................ H04N 21/41407
USPC ............ 379/387.01; 348/207.1–376; 725/62; 345/156; 370/486
See application file for complete search history.

(56) References Cited

U.S. PATENT DOCUMENTS

| 6,952,229 | B1* | 10/2005 | Takahashi et al. ........ 348/333.02 |
| 7,337,403 | B2* | 2/2008 | Pavley et al. .................. 715/747 |
| 8,072,416 | B2* | 12/2011 | Yang et al. ..................... 345/156 |
| 2002/0037743 | A1* | 3/2002 | Takahashi ...................... 455/556 |
| 2002/0054116 | A1* | 5/2002 | Pavley et al. .................. 345/765 |
| 2003/0071907 | A1 | 4/2003 | Karasaki et al. |
| 2003/0133015 | A1* | 7/2003 | Jackel et al. ............... 348/207.1 |
| 2004/0051741 | A1 | 3/2004 | Venturino |
| 2005/0174431 | A1* | 8/2005 | Ohmura et al. ............ 348/207.1 |
| 2005/0270995 | A1* | 12/2005 | Byun et al. ..................... 370/312 |

FOREIGN PATENT DOCUMENTS

| CN | 1355649 A | 11/2001 |
| JP | 2001-326796 | 11/2001 |
| JP | 2002-176578 | 6/2002 |
| KR | 1020040041819 A | 5/2004 |

(Continued)

OTHER PUBLICATIONS

Sony Cyber-shot V1 Digital Still Camera User Guide, Jun. 29, 2005.

*Primary Examiner* — Alexander Jamal
(74) *Attorney, Agent, or Firm* — Roylance, Abrams, Berdo & Goodman, LLP

(57) ABSTRACT

An integrated digital device and method for selecting functions are provided. A button is positioned adjacent to a display unit for selecting functions according to a mode change. Icons are displayed for the selected function via the display device. The integrated digital device includes a display unit for displaying multimedia content and at least one of function selection icon for the multimedia content, a function selection button unit disposed adjacent to the displayed function selection icons, and a mode dial, which is disposed on one side of the device adjacent to another side where the display unit is disposed, and which receives an input of one of a plurality of modes as the mode dial is rotated at a regular interval.

10 Claims, 2 Drawing Sheets

(56) References Cited

FOREIGN PATENT DOCUMENTS

| KR | 10-2004-0066259 | 7/2004 |
| KR | 1020040066222 | 7/2004 |
| KR | 1020050055674 A | 6/2005 |

* cited by examiner

INTEGRATED DIGITAL DEVICE AND SELECTING METHOD THEREOF

CROSS-REFERENCE TO RELATED APPLICATION

This application claims the benefit under 35 U.S.C. §119(a) of Korean Patent Application No. 10-2005-0080352 filed on Aug. 30, 2005 in the Korean Intellectual Property Office, and claims the benefit under 35 U.S.C. §119(e) of U.S. Provisional Patent Application No. 60/701,114 filed on Jul. 21, 2005 in the United States Patent and Trademark Office, the entire disclosures of which are hereby incorporated by reference.

BACKGROUND OF THE INVENTION

1. Field of the Invention

The present invention relates to an integrated digital device. More particularly, the present invention relates to an integrated digital device and method that has a button adjacent to a display unit for selecting functions according to a mode change, and that displays icons for the selected function via the display device.

2. Description of the Prior Art

There is an increasing trend to combine a plurality of digital devices into one integrated device. Plural functions for setting plural sets of information desired by a user should be provided to control the functions of the plurality of digital devices. A plurality of input means, such as buttons, may be provided to facilitate a user's ability to quickly change set information.

However, it is impractical to place numerous input means, such as buttons, on the integrated device.

In order to overcome this problem, a display means, such as a liquid crystal display (LCD), is provided. The LCD employs a menu screen for selecting and executing a desired process according to certain combination of a "select" button and a "confirm" button. However, this case leads to a complicated and time consuming selection process.

Accordingly, there is a need for an improved system and method for facilitating a user's selection of plural function modes of an integrated device.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to facilitate a user's selection of plural function modes of an integrated device by employing a rotary switch type mode selection dial on one side of an integrated digital device.

Another object of an exemplary embodiment of the present invention is to facilitate a user's control of plural functions by using a small number of buttons by allocating functions for setting function modes of the integrated digital device and other information to the several input keys.

In order to accomplish these objects, an integrated digital device is provided. According to an exemplary embodiment of the present invention, the integrated digital device includes a display unit which displays multimedia content and at least one of function selection icons for the multimedia content, a function selection button unit disposed adjacent to the displayed function selection icons, and a mode dial, disposed on one side adjacent to another side on which the display unit is disposed, which receives an input of one of a plurality of modes as the mode dial is rotated at a regular interval.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description, such as the detailed construction and elements, are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
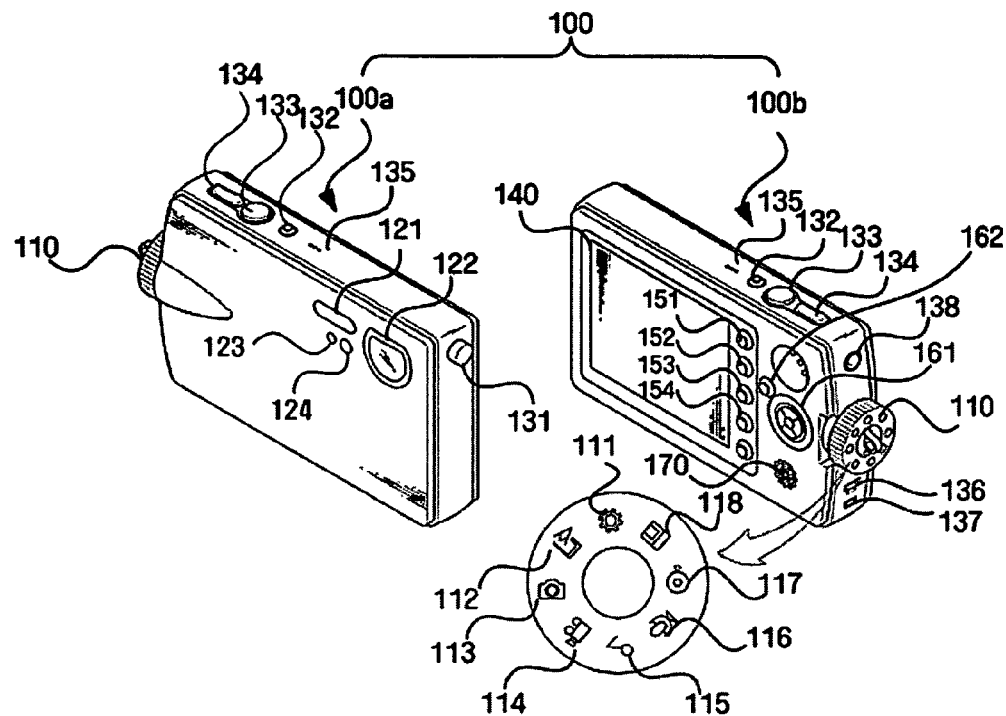
FIG. 1 is a perspective view of an integrated digital device according to an exemplary embodiment of the present invention.

FIG. 1 is a perspective view of an integrated digital device 100 according to an exemplary embodiment of the present invention.

According to an exemplary embodiment of the present invention, the integrated digital device 100 is a multifunction device incorporated with a plurality of digital devices such as a digital camera, a digital camcorder, a digital multimedia broadcasting (DMB) receiver, an MP3 player, a voice recorder, a universal serial bus (USB) storage device, and a PC camera.

According to another exemplary embodiment of the present invention, the integrated digital device 100 will now be described with reference to a front perspective view 100a and a rear perspective view 100b.

A display unit 140 on a broad side of the integrated digital device 100 with a thin hexahedron shape shows at least one function selecting icon for multimedia content.

The multimedia content may be a digital still image, a digital video, a digital moving picture, or digital multimedia broadcasts. The function selecting icon may be an image for representing a function, such as play, stop, search, and others, for the multimedia content.

The user adjusts a mode dial 110 positioned on one side of the device 100 in order to select the operation mode of the integrated digital device 100 according to the exemplary embodiment of the present invention.

Specifically, the integrated digital device 100 includes a rotary switch type mode dial 110 for selecting one of a plurality of modes. The mode dial 110 is positioned at one side of the integrated digital device which is adjacent to the display unit 140. When the mode dial 110 is rotated one interval, one of a plurality of modes is selected.

The mode comprises a digital camera mode 113, a digital camcorder mode 114, a DMB receiver mode 112, an MP3 player mode 115, a voice recorder mode 116, a USB storage device mode 118, a PC camera mode 117, and a setting mode 111.

The integrated digital device 100, according to the exemplary embodiment of the present invention, uses a mode dial 110 to choose one mode corresponding to one device of a plurality of digital devices. For example, if the mode dial 110 is switched to the digital camera mode 113, function selection buttons 151 through 154 of the integrated digital device 100 are set to implement the functions required for photography. If the mode dial 110 is switched to the DMB broadcasting receiver mode 112, function selection buttons 151 through 154 of the integrated digital device 100 are set to implement the functions of the DMB broadcasting receiver.

Icons which are indications of modes may be displayed on the surface of the mode dial 110. In this case, the icons are displayed on an upper surface of a barrel so that the user can see all of the icons at one time. Therefore, the user can easily select a desired mode.

Eight icons may be displayed on the mode dial 110, and the icons are spaced at regular intervals apart from each other. Therefore, the user can rotate the mode dial 110 by, for example, 45 degrees to select a mode. On a lower surface of the barrel a lock is provided (not shown) for securing the dial in the selected mode; the lock has a resilient means, such as a spring, to prevent movement of the mode dial after the mode is selected.

The functions of the function selection buttons 151 through 154, which can be changed by the mode selection of the integrated digital device 100, are displayed on the display unit 140.

As described above, the mode dial 110 is disposed on one thin side of the integrated digital device 100. Preferably, the mode dial has a cylindrical shape so that it is easily rotated to select the mode. Alternatively, the mode dial may be installed in a cylindrical groove formed in one side of the integrated digital device 100. A portion of the groove bordering the broad side (front side or rear side) of the integrated digital device 100 is cut to expose a portion of the mode dial 110 which permits the user to easily adjust the mode dial.

The integrated digital device may include a button for generating an electrical signal to implement the function selected by the function selection icon. The function selection buttons 151 through 154 are a plurality of buttons formed adjacent to an edge of the display unit 140.

The function selection buttons 151 through 154 for inputting set information according to the mode selected by the operation of the mode dial 110 are disposed adjacent to the display unit 140. In particular, the function selection buttons 151 through 154 are disposed adjacent to portions 141 through 144, in which icons illustrating the function selection are displayed on the display unit 140.

The function selection icon may be changed based on the type of multimedia content displayed on the display unit 140. Icons used to implement the functions for the multimedia content of interest may be displayed. Alternatively, icons selected by the user may be displayed.

The function selection icons may be displayed along the edge of the display unit 140 corresponding to the function selection buttons 151 through 154. This will allow the user to directly recognize the corresponding relation between each button of the function selection buttons 151 through 154 and the function selection icons in order to easily select the function.

The user may move a pointer by using a four-direction key 161 to select a menu item or the desired content on a small view screen, and confirm the selection.

The integrated digital device 100 according to an exemplary embodiment of the present invention may include an A/V connector 138 for transmitting audio or images to external appliances. The A/V connector 138 may be disposed on one side of the integrated digital device 100 on which the mode dial 110 is positioned. The A/V connector 138 may be formed as one port to make the device more compact. That is, audio and images may be output through one A/V connector 138.

Also, the integrated digital device 100 includes a storage unit which may be used for data storage. In this case, the integrated digital device 100 may include a USB port 136 for input and output of data. The USB port 136 may be disposed on one side of the integrated digital device 100 near the mode dial 110. As well as stored data, the USB port 136 may output the image, input via a lens unit 122, through a cable connected to the USB port 136. The user may transmit the image to a PC by selecting the PC camera mode 117 using the mode dial 110.

The storage unit comprises a flash memory, a compact flash card (CF) card, a secure digital (SD) card, a smart media card, a multimedia (MMC) card, and a memory stick.

The integrated digital device 100 also includes a power input port 137 adjacent to the USB port 136. The power input via the power input port 137 is used to operate the integrated digital device 100, and charge a built-in battery.

A menu button 162 for displaying a menu screen to set a menu, a 4-direction key 161 for moving the pointer up, down, right, and left, and a speaker 170 for outputting the sound may be disposed on the rear portion of the integrated digital device 100 opposite to the display unit 140.

The integrated digital device 100 may include a power switch 132, a shutter button 133, a zoom button 134, and a microphone 135, which may be positioned in a row on an upper side perpendicular to the side on which the mode dial 110 is positioned. Hence, the user can manipulate the power supply, shutter, and zoom operations using only his/her index finger.

Figure 3:
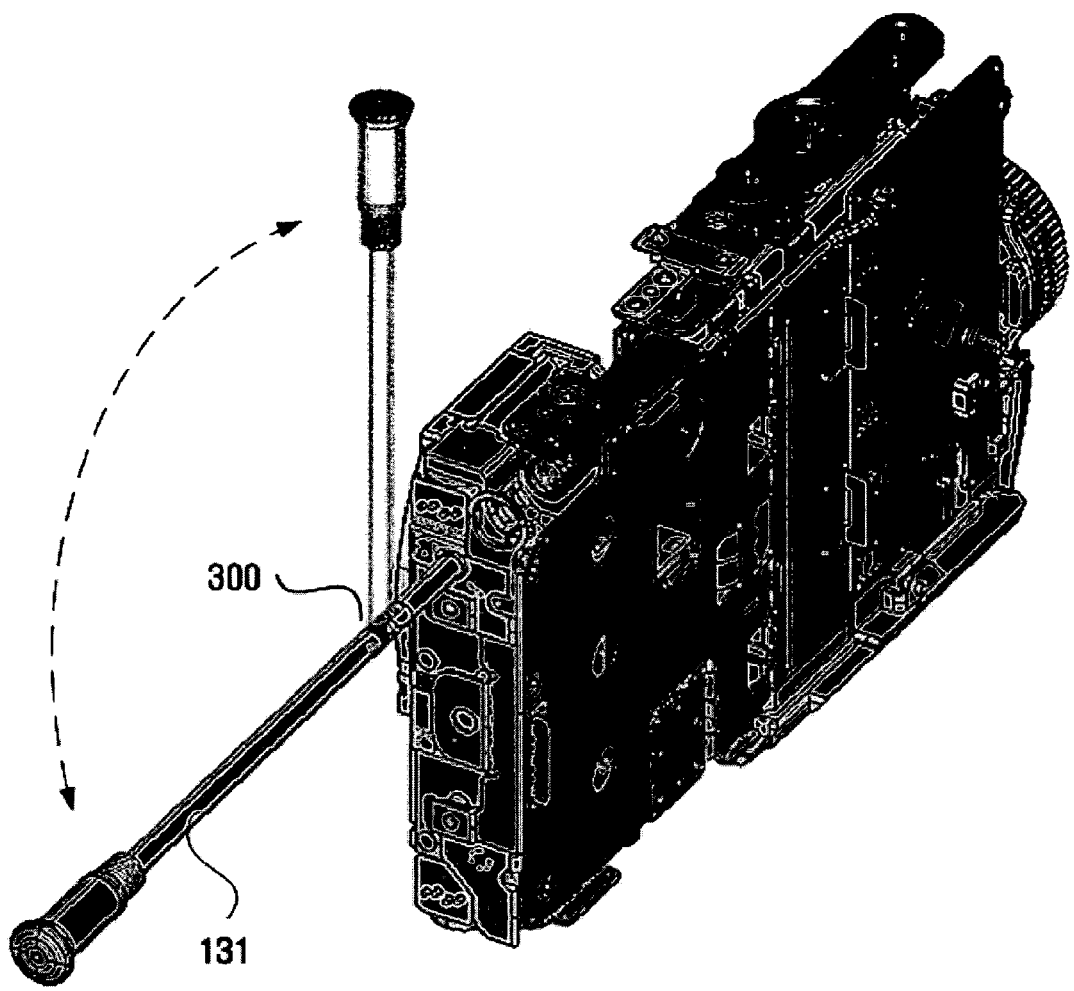
FIG. 3 is a perspective view of an antenna provided in the integrated digital device according to an exemplary embodiment of the present invention.

As illustrated in FIG. 3, the integrated digital device 100 may include a slide antenna 131 for receiving digital multimedia broadcasting. The antenna 131 is adapted to slide in and out of a hole formed on one side of the integrated digital device 100.

On the front portion of the integrated digital device 100, a lens unit 122, a flash 121, an auxiliary flash 124, and an optical sensor 123 are installed.

The lens unit 122 is composed of a lens for converting incident light into an electrical signal, and a lens protective cover for protecting the lens. The lens protective cover is configured to open and shut so that the lens receives light when the integrated digital device 100 is switched into a light input mode (for example, the digital camera mode 113 or digital camcorder mode 114).

The flash 121 and the auxiliary flash 124 radiate light onto an object and compensate for a lack of incident light. The optical sensor 123 detects the magnitude of the light to permit the integrated digital device 100 to determine operation settings of the flash 121 or auxiliary flash 124.

Figure 2:
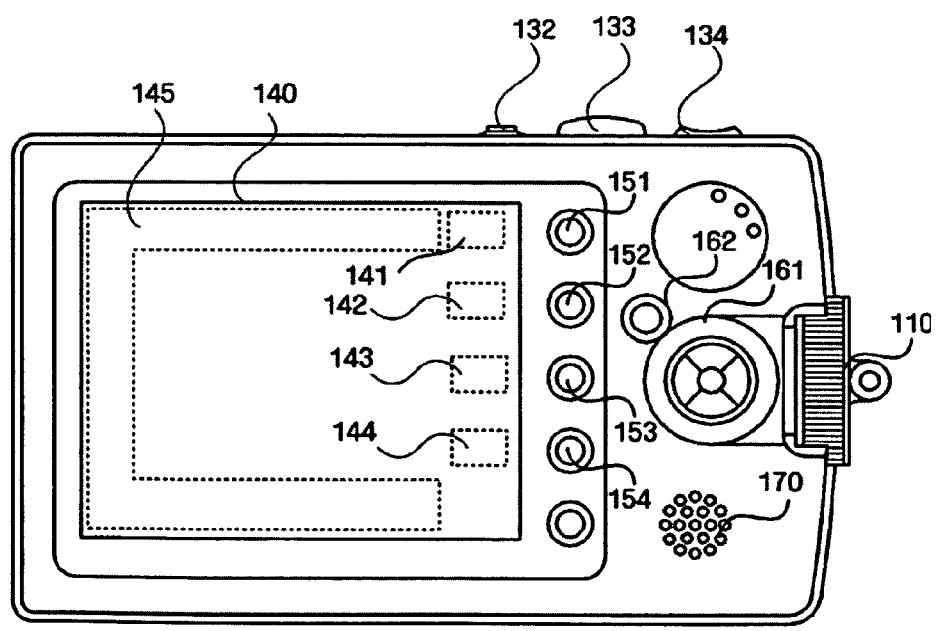
FIG. 2 is a rear view of an integrated digital device according to an exemplary embodiment of the present invention.

FIG. 2 is a rear view of the integrated digital device 100 according to an exemplary embodiment of the present invention.

The display unit 140 resides on the rear portion of the integrated digital device 100. Portions 141 through 144 for displaying the icons showing the information set by each of the function selection buttons 151 through 154 are included in the display unit 140. The display unit 140 also includes a portion 145 for displaying diverse icons showing the state information of the integrated digital device 100, and the function selection buttons 151 through 154 adjacent to the portions 141 through 144.

Since the portions 141 through 144 for displaying the icons showing the information set by the function selection buttons 151 through 154 are positioned adjacent to the function selection buttons 151 through 154, the user can easily grasp the settings of the function selection buttons.

Further, the settings of the function selection buttons 151 are displayed by icons that the user can easily recognize, thereby making the device user-friendly.

FIG. 3 is a perspective view of the antenna of the device according to an exemplary embodiment of the present invention. The antenna 131 is inserted into the hole formed on one narrow side of the integrated digital device 100, and is disposed along the axis of the device. The user draws the antenna 131 from the hole, and the antenna 131 pivots around a hinge member 300 installed in a specific portion in the antenna 131.

The integrated digital device described above, according to an exemplary embodiment of the present invention, produces at least one of the following effects.

First, the rotary switch type mode dial, which is disposed on one side of the device adjacent to another side comprising the display unit, receives an input of one of a plurality of modes as the mode dial is rotated at regular intervals. This facilitates a user's easy selection of a mode.

Second, the integrated digital device facilitates a user's control of plural functions using a small number of buttons by allocating functions for setting functional modes of the integrated digital device and other information to the input keys.

While the present invention has been shown and described with reference to certain exemplary embodiments thereof, it will be understood by those skilled in the art that various changes in form and details may be made without departing from the scope and spirit of the invention as defined by the appended claims and their equivalents.

What is claimed is:

1. An integrated digital device operable in a plurality of modes each corresponding to one of a plurality of digital devices, comprising:
   a mode selector for selecting one of the modes which comprise at least a digital multimedia broadcasting (DMB) receiver mode for receiving a digital multimedia broadcast for mobile devices, the digital multimedia broadcast comprising at least one of TV, radio and datacasting;
   a display unit for displaying multimedia content and at least one function for the multimedia content, the function corresponding to the selected mode;
   a function selection button unit disposed adjacent to the at least one displayed function; and
   an antenna for receiving the digital multimedia broadcast if the selected mode is the digital multimedia broadcasting receiver mode;
   wherein, when one of the modes is selected by the mode selector, the display unit and the function receive input corresponding to the selected mode to configure the integrated digital device for use as the digital device corresponding to the selected mode.

2. The integrated digital device of claim 1, wherein the modes comprise a digital camera mode, a digital camcorder mode, the DMB receiver mode, an MP3 player mode, a voice recorder mode, a USB storage device mode, a PC camera mode, and a setting mode.

3. The integrated digital device of claim 1, wherein the function selection button unit receives a function selection input for the function that is displayed corresponding to the selected mode.

4. A method of selecting functions in an integrated digital device operable in a plurality of modes each corresponding to one of a plurality of digital devices, the method comprising:
   selecting a mode from the plurality of modes which comprise at least a digital multimedia broadcasting (DMB) receiver mode for receiving a digital multimedia broadcast for mobile devices, the digital multimedia broadcast comprising at least one of TV, radio and datacasting;
   displaying multimedia content and at least one function for the multimedia content, the function corresponding to the selected mode;
   receiving an input corresponding to the selected mode to configure the integrated digital device to perform the functions of the digital device corresponding to the selected mode, as a mode selector selects the mode; and
   receiving, by an antenna, the digital multimedia broadcast if the selected mode is the digital multimedia broadcasting receiver mode.

5. The method of claim 4, wherein the method comprises receiving a function selection input for the function that is displayed corresponding to the input mode.

6. The method of claim 4, wherein the method further comprises receiving a digital multimedia broadcast if the selected mode comprises a digital multimedia broadcast receiving mode.

7. The method of claim 4, wherein the modes comprise a digital camera mode, a digital camcorder mode, the DMB receiver mode, an MP3 player mode, a voice recorder mode, a USB storage device mode, a PC camera mode, and a setting mode.

8. The integrated digital device of claim 1, wherein the mode selector is disposed on one side of the integrated digital device adjacent to another side comprising the display unit.

9. The integrated digital device of claim 1, wherein the mode selector is rotated at a regular interval.

10. The method of claim 4, wherein the mode selector is rotated at a regular interval.

* * * * *